US010802250B2

(12) United States Patent
Tseng et al.

(10) Patent No.: US 10,802,250 B2
(45) Date of Patent: Oct. 13, 2020

(54) OPTICAL IMAGE LENS

(71) Applicant: CALIN TECHNOLOGY CO., LTD., Taichung (TW)

(72) Inventors: Chien-Hsiung Tseng, Hsinchu (TW); Chia-Wei Liao, Taichung (TW)

(73) Assignee: CALIN TECHNOLOGY CO., LTD., Taichung (TW)

( * ) Notice: Subject to any disclaimer, the term of this patent is extended or adjusted under 35 U.S.C. 154(b) by 224 days.

(21) Appl. No.: 16/161,536

(22) Filed: Oct. 16, 2018

(65) Prior Publication Data

US 2020/0064593 A1 Feb. 27, 2020

(30) Foreign Application Priority Data

Aug. 21, 2018 (TW) ............................ 107129120 A

(51) Int. Cl.
*G02B 9/64* (2006.01)
*G02B 5/20* (2006.01)
*G02B 13/00* (2006.01)

(52) U.S. Cl.
CPC ............... *G02B 9/64* (2013.01); *G02B 5/208* (2013.01); *G02B 13/0045* (2013.01)

(58) Field of Classification Search
CPC ...... G02B 9/64; G02B 5/208; G02B 13/0045; G02B 13/005; G02B 13/02; G02B 15/1461
USPC .................................................. 359/642, 754
See application file for complete search history.

(56) References Cited

U.S. PATENT DOCUMENTS

| | | | | |
|---|---|---|---|---|
| 10,067,319 | B2 * | 9/2018 | Kim | G02B 13/006 |
| 2017/0176721 | A1 * | 6/2017 | Kim | G02B 27/646 |
| 2019/0162933 | A1 * | 5/2019 | Zheng | G02B 13/005 |

* cited by examiner

*Primary Examiner* — Tuyen Tra
(74) *Attorney, Agent, or Firm* — Birch, Stewart, Kolasch & Birch, LLP

(57) ABSTRACT

An optical image lens used in narrow field of view and having compact size and low distortion characteristics is disclosed to include, from an object side to an image side along an optical axis, a first lens with positive refractive power, a second lens and a third lens glued as a doublet with negative refractive power, a fourth lens and a fifth lens glued as a doublet with positive refractive power, a sixth lens with positive refractive power, a seventh lens with positive refractive power, and an eighth lens with negative refractive power.

18 Claims, 12 Drawing Sheets

OPTICAL IMAGE LENS

BACKGROUND OF THE INVENTION

1. Field of the Invention

The present invention relates to the field of application of optical image systems and more particular, to an optical image lens, which has the characteristics of low distortion and good imaging quality.

2. Description of the Related Art

In recent years, with the rise of portable electronic products with photographic functions, the demand for optical systems is increasing. The image sensor of a general optical system is nothing more than a charge coupled device (CCD) or a complementary metal-oxide semiconductor sensor (CMOS Sensor). With the advancement of semiconductor process technology, the pixel size of an image sensor is reduced, and the optical system is gradually developing into the high-pixel field. Further, with the rapid development of drones and driverless vehicles, the advanced driver assistance system (ADAS) plays an important role. It uses a variety of lenses and sensors to collect environmental information, ensuring driver safety. In addition, with the change in the temperature of the external application environment, the demand for the lens quality of vehicle imaging lenses relative to temperature is also increased. Therefore, the requirements for image quality are also increasing.

Good imaging lenses generally have the advantages of low distortion, high resolution, etc. In practical applications, the problem of small size and cost must be considered. Therefore, designing a lens with good image quality under various constraints is a big problem for designers.

SUMMARY OF THE INVENTION

The present invention has been accomplished under the circumstances in view. It is therefore the main object of the present invention to provide an optical image lens, which has the characteristics of good imaging quality and low distortion.

To achieve this and other objects of the present invention, an optical image lens comprises, from an object side to an image side along an optical axis, a first lens having positive refractive power, a second lens, a third lens bonded with the second lens to form a first doublet having positive refractive power, a fourth lens, a fifth lens bonded with the fourth lens to form a second doublet having positive refractive power, a sixth lens having positive refractive power, a seventh lens having positive refractive power, and an eighth lens having negative refractive power.

To achieve this and other objects of the present invention, an optical image lens comprises, from an object side to an image side along an optical axis, a first lens, a second lens, a third lens, a fourth lens, a fifth lens, a sixth lens, a seventh lens, and an eighth lens. The optical image lens satisfies the conditions of: $0.68<f/f1<0.97$; $0.28<f/f7<0.48$; $0.21<f/(f1+f2+f3+f4+f5+f6+f7+f8)<0.29$; wherein f is the focal length of the optical image lens; f1 is a focal length of the first lens; f2 is a focal length of the second lens; f3 is a focal length of the third lens; f4 is a focal length of the fourth lens; f5 is a focal length of the fifth lens; f6 is a focal length of the sixth lens; f7 is a focal length of the seventh lens; f8 is a focal length of the eighth lens.

The effect of the invention is that, with the above design, an optical image lens with good imaging quality and low distortion could be realized.

BRIEF DESCRIPTION OF THE DRAWINGS

The present invention will be best understood by referring to the following detailed description of some illustrative embodiments in conjunction with the accompanying drawings, in which.

DETAILED DESCRIPTION OF THE INVENTION

Figure 1:
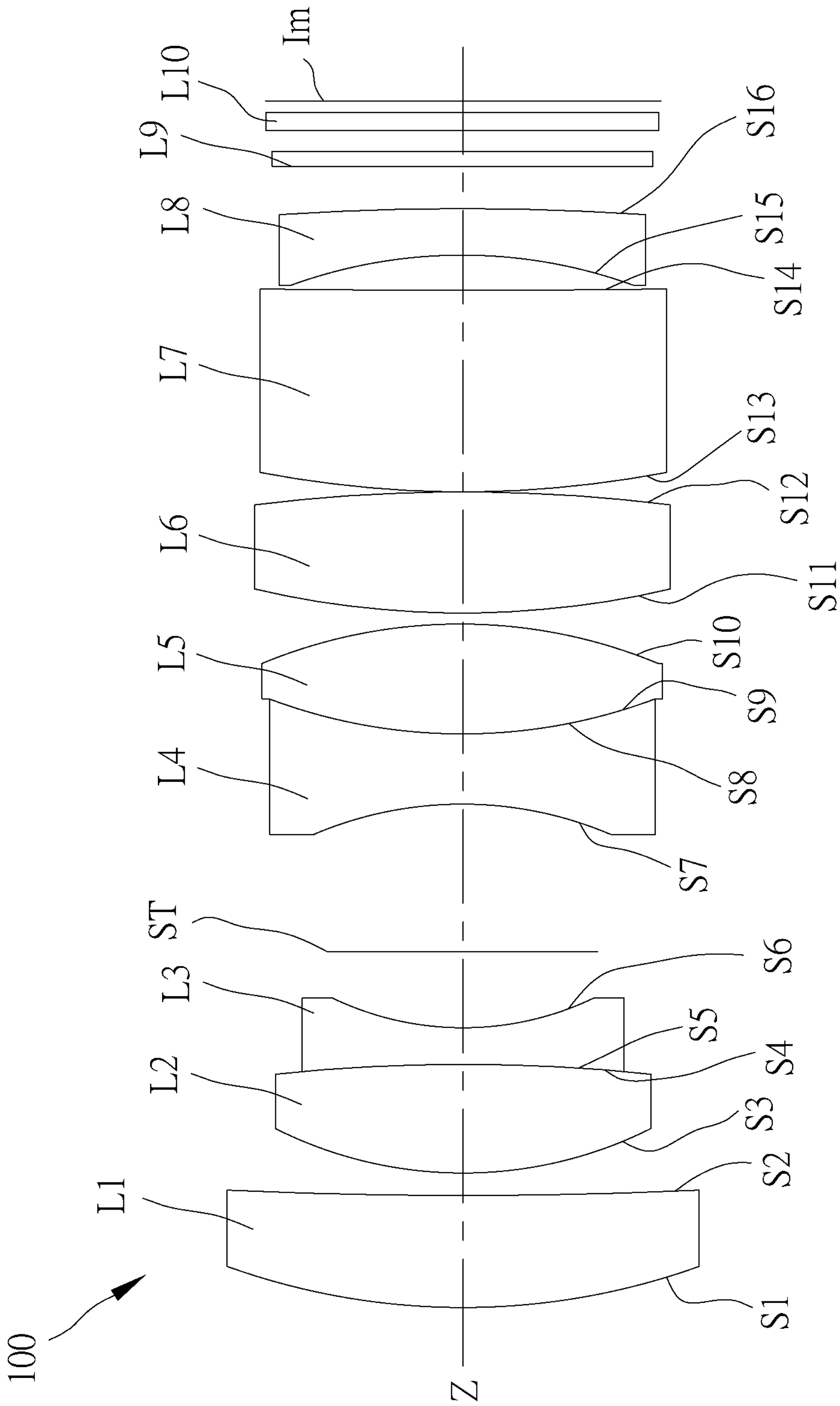
FIG. 1 is a schematic drawing illustrating an optical image lens in accordance with a first embodiment of the present invention.

Referring to FIG. 1, an optical image lens 100 in accordance with a first embodiment of the present invention is shown. The optical image lens 100 comprises, from an object side to an image side along an optical axis, a first lens L1, a second lens L2, a third lens L3, a fourth lens L4, a fifth lens L5, a sixth lens L6, a seventh lens L7 and an eighth lens L8.

The first lens L1 has positive refractive power, and an object side surface S1 is a convex surface, and the image side surface S2 can be designed as a plane or a concave surface. In the current embodiment, an image side surface S2 is designed as a concave surface.

The second lens L2 and the third lens L3 are glued to form a first doublet, which could effectively improve the chromatic aberration of the lens and control the aberration generation. In an embodiment, the surface of the second lens L2 bonding to the third lens L3 may be designed as a plane or a convex surface convex toward the image side. Preferably, in the current embodiment, the first doublet has negative refractive power. Further, in the current embodiment, the second lens L2 has positive refractive power, and an object side surface S3 is a convex surface, and an image side surface S4 is also a convex surface. The third lens L3 has negative refractive power, and an object side surface S5 is a concave surface glued to the image side surface S4 of the second lens L2, and an image side surface S6 is a concave surface. The surface of the second lens L2 bonding to the bonding surface of the third lens L3 in this embodiment is a convex surface convex toward the image side. Further, in an embodiment, the image side surface S4 of the second lens L2 and the object side surface S5 of the third lens L3 can be designed as a plane, and after the second lens L2 and the third lens L3 are glued, the glue surface is flat.

The fourth lens L4 and the fifth lens L5 are glued to form a second doublet, which could effectively improve the chromatic aberration of the lens and control the aberration generation. Preferably; the second doublet has positive refractive power. The fourth lens L4 has negative refractive power, and an object side surface S7 is a concave surface. In this embodiment, the fourth lens L4 is a biconcave lens, and the object side surface S7 and an image side surface S8 are both concave surfaces. The fifth lens L5 has positive refractive power, and an image side surface S10 is a convex surface. In this embodiment, the fifth lens L5 is a biconvex lens, and an object side surface S9 is a convex surface glued to the image side surface S8 of the fourth lens L4. The surface of the fourth lens L4 bonding to the fifth lens L5 is a convex surface convex toward the object side.

The sixth lens L6 has positive refractive power. In this embodiment, the sixth lens L6 is a biconvex lens, and an object side surface S11 and an image side surface S12 are both convex surfaces.

The seventh lens L7 has positive refractive power, and an object side surface S13 is a convex surface, and an image side surface S14 can be designed as a plane or a concave surface. In the current embodiment, the seventh lens L7 is a meniscus lens, and the object side surface S13 is a convex surface, and the image side surface S14 is a concave surface.

The eighth lens L8 has negative refractive power. The eighth lens L8 may be a plano-concave lens, a biconcave lens or a meniscus lens having the concave surface thereof facing the object side. In this embodiment, the eighth lens L8 is a meniscus lens, an object side surface S15 is a concave surface, and an image side surface S16 is a convex surface.

The optical image lens 100 further comprises an aperture ST, an infrared filter L9 and a protective glass L10. The aperture ST is disposed between the third lens L3 and the fourth lens L4. The infrared filter L9 is disposed between the eighth lens L8 and the protective glass L10. Preferably, the infrared filter L9 is made of glass. The protective glass L10 is disposed between the infrared filter L9 and the imaging surface Im.

In order to maintain good optical performance and high image quality of the optical image lens 100 of the present invention, the optical image lens 100 also satisfies the following conditions:

$$0.68<f/f1<0.97; \quad (1)$$

$$0.28<f/f7<0.48; \quad (2)$$

$$-0.5<f/f23<-0.81; \quad (3)$$

$$0.21<f/(f1+f2+f3+f4+f5+f6+f7+f8)<0.29; \quad (4)$$

$$Vd2\geq 60; \quad (5)$$

wherein, f is the focal length of the optical image lens 100; f1 is a focal length of the first lens L1; f2 is a focal length of the second lens L2; f3 is a focal length of the third lens L3; f4 is a focal length of the fourth lens L4; f5 is a focal length of the fifth lens L5; f6 is a focal length of the sixth lens L6; f7 is a focal length of the seventh lens L7; f8 is a focal length of the eighth lens L8; f23 is a focal length of the first doublet; Vd2 is an Abbe number of the second lens L2. In addition, preferably, the optical image lens 100 has a full field of view between 27 degrees and 40 degrees.

Table I below is the data of the optical image lens 100 of the first embodiment of the present invention, including the focal length f (effective focal length) of the optical image lens 100, aperture value Fno, field of view FOV, the radius of curvature R of each lens, the distance between each surface and the next surface on the optical axis, the refractive index Nd of each lens and the Abbe number Vd of each lens, in which the unit of focal length, radius of curvature and thickness is mm.

TABLE I f = 20.97 mm; Fno = 1.96; FOV = 27°

| Serial No. | Radius of curvature (mm) | Thickness (mm) | (Nd) | (Vd) | |
|---|---|---|---|---|---|
| 1 | 18.351 | 3.024 | 1.99 | 50.8 | 1st lens |
| 2 | 114.569 | 0.628 | | | |
| 3 | 10.592 | 2.972 | 1.61 | 60.5 | 2nd lens |
| 4 | −36.279 | 0.995 | 1.79 | 29.3 | 3rd lens |
| 5 | 7.402 | 2.117 | | | |
| 6 | infinity | 4.035 | | | |
| 7 | −10.099 | 1.930 | 1.63 | 61.2 | 4th lens |
| 8 | 13.802 | 2.986 | 1.79 | 44.4 | 5th lens |
| 9 | −13.802 | 0.343 | | | |
| 10 | 24.090 | 3.274 | 1.75 | 70.1 | 6th lens |
| 11 | −49.211 | 0.033 | | | |
| 12 | 27.745 | 5.507 | 1.49 | 70 | 7th lens |
| 13 | 220.466 | 0.975 | | | |
| 14 | −13.533 | 1.248 | 2.03 | 17 | 8th lens |
| 15 | −88.064 | 1.181 | | | |
| 16 | infinity | 0.400 | 1.51 | 64.1 | Infrared filter |
| 17 | infinity | 0.605 | | | |
| 18 | infinity | 0.500 | 1.51 | 64.1 | Protective glass |
| 19 | infinity | 0.275 | | | |
| 20 | infinity | | | | |

From the above Table I we can see that the focal length f of the optical image lens 100 is 20.97 mm; the focal length f1 of the first lens L1 is 21.7 mm; the focal length f2 of the second lens L2 is 18.55 mm; the focal length 13 of the third lens L3 is −8.92 mm; the focal length f4 of the fourth lens IA is −20 mm; the focal length f5 of the fifth lens L5 is 14.59 mm; the focal length f6 of the sixth lens L6 is 21.95 mm; the focal length 17 of the seventh lens L7 is 63.8 mm; the focal length f8 of the eighth lens L8 is −15.47 mm; the focal length f23 of the first doublet is −26 mm; the Abbe number Vd2 of the second lens L2 is 60.5. From the above, it can be concluded that f (f1+f2+f3+f4+f5+f6+f7+f8) is about 0.2179, Vd2=60.5, f/f7 is about 0.3286, f/f23 is about −0.8065, f/f1 is about 0.9663, which satisfies the conditions set by points (1) to (5) above.

Figure 2:
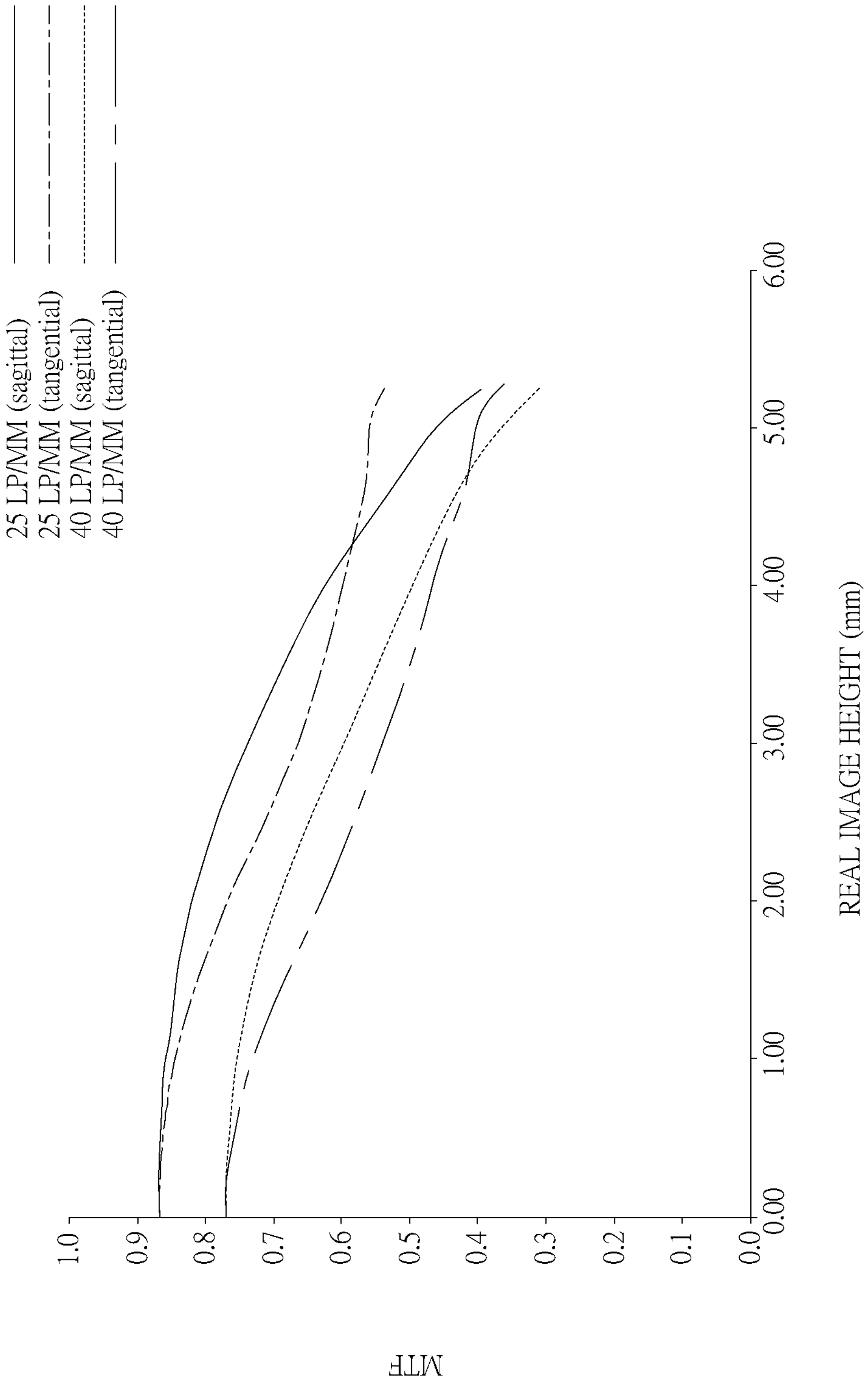
FIG. 2A is an MTF (modulation transfer function) chart of the optical image lens in accordance with the first embodiment of the present invention.
FIG. 2B illustrates the astigmatic field curves of the optical image lens in accordance with the first embodiment of the present invention.
FIG. 2C is the distortion chart of the optical image lens in accordance with the first embodiment of the present invention.
Figure 2B:
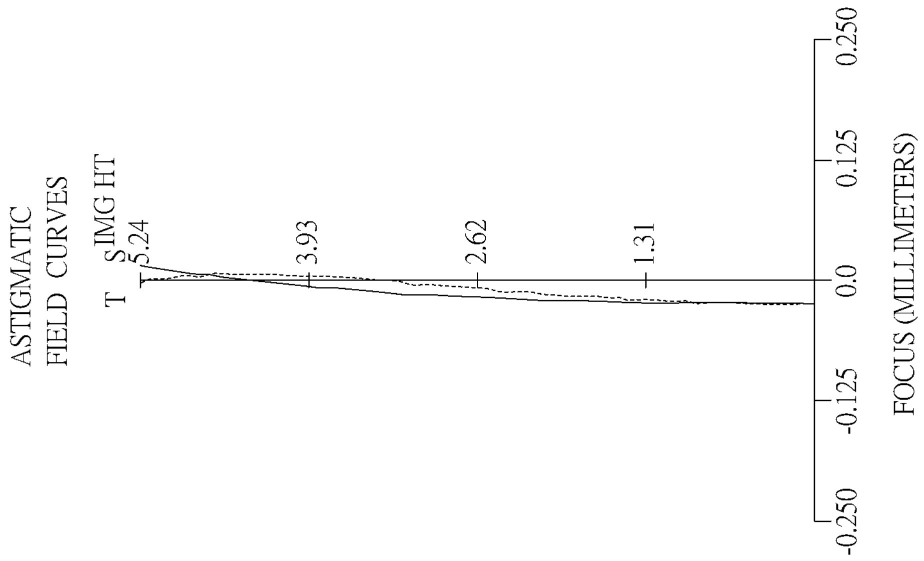
Figure 2C:
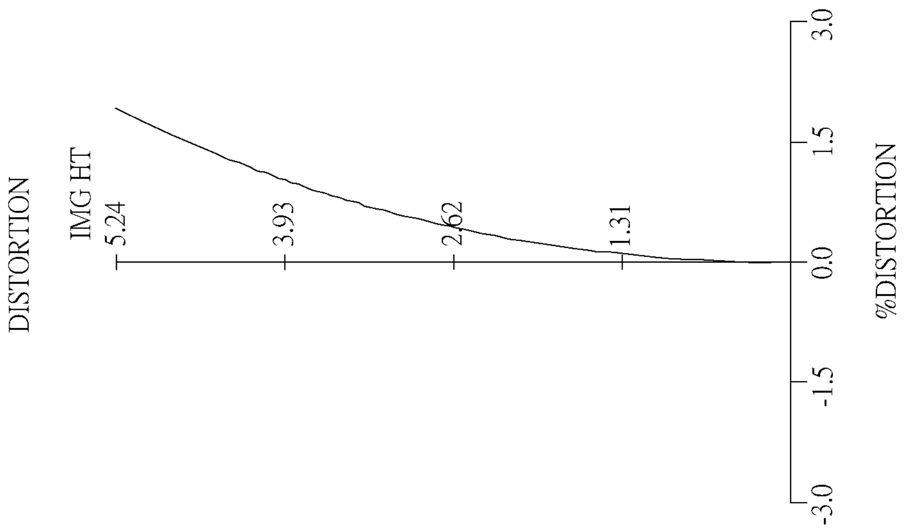

As shown in FIG. 2A to FIG. 2C, the optical image lens 100 of the first embodiment of the present invention could effectively improve the image quality and reduce the distortion.

Figure 3:
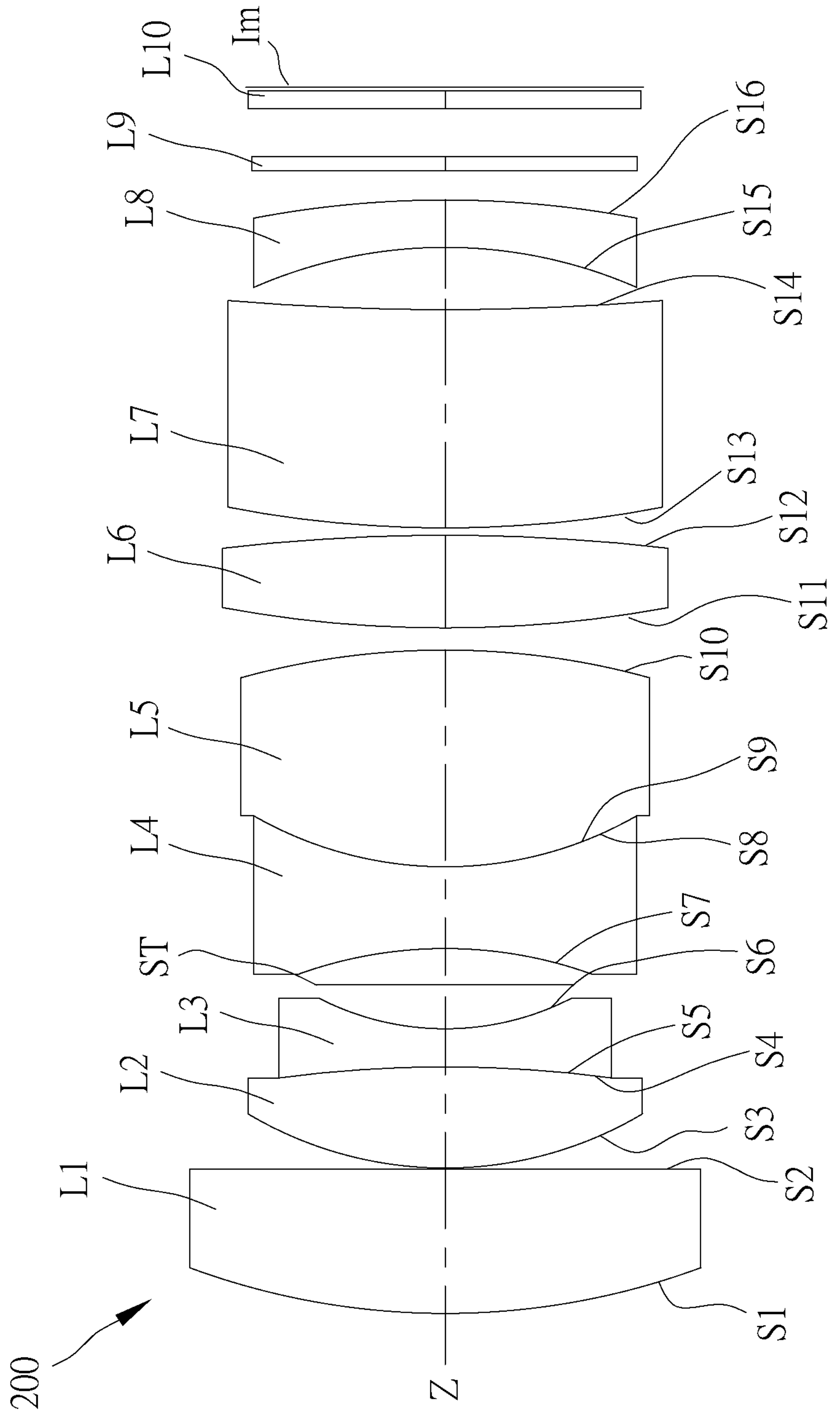
FIG. 3 is a schematic drawing illustrating an optical image lens in accordance with a second embodiment of the present invention.

Referring to FIG. 3, an optical image lens 200 in accordance with a second embodiment of the present invention is shown. The optical image lens 200 comprises, from an object side to an image side along an optical axis Z, a first lens L1, a second lens L2, a third lens L3, a fourth lens L4, a fifth lens L5, a sixth lens L6, a seventh lens L7 and an eighth lens L8.

The first lens L1 has positive refractive power, and an object side surface S1 is a convex surface, and an image side surface S2 is a plane.

The second lens L2 and the third lens L3 are glued to form a first doublet, which could effectively improve the chromatic aberration of the lens and control the aberration generation. Preferably, in this embodiment, the first doublet has negative refractive power. Further, in this embodiment, the second lens L2 has positive refractive power, and an object side surface S3 is a convex surface, and an image side surface S4 is also a convex surface; the third lens L3 has negative refractive power, and an object side surface S5 is a concave surface glued to the image side surface S4 of the second lens L2, and an image side surface S6 is a concave surface; the surface of the second lens L2 bonding to the third lens L3 is a convex surface convex toward the image side.

The fourth lens L4 and the fifth lens L5 are glued to form a second doublet, which could effectively improve the chromatic aberration of the lens and control the aberration generation. Preferably, the second doublet has positive refractive power. The fourth lens L4 has negative refractive power, and an object side surface S7 is a concave surface. In this embodiment, the fourth lens L4 is a biconcave lens, and the object side surface S7 and an image side surface S8 are both concave surfaces. The fifth lens L5 has positive refractive power, and an image side surface S10 is a convex surface. In this embodiment, the fifth lens L5 is a biconvex lens, and an object side surface S9 is a convex surface glued to the image side surface S8 of the fourth lens L4. The surface of the fourth lens L4 bonded to the fifth lens L5 is a convex surface convex toward the object side.

The sixth lens L6 has positive refractive power. In this embodiment, the sixth lens L6 is a biconvex lens, and an object side surface S11 and an image side surface S12 are both convex surfaces.

The seventh lens L7 has positive refractive power, and an object side surface S13 is a convex surface, and the image side surface can be designed as a plane or a concave surface. In this embodiment, the seventh lens L7 is a meniscus lens, and the object side surface S13 is a convex surface, and an image side surface S14 is a concave surface.

The eighth lens L8 has negative refractive power. The eighth lens L8 may be a plano-concave lens, a biconcave lens or a meniscus lens having the concave surface thereof facing the object side. In this embodiment, the eighth lens L8 is a meniscus lens, and an object side surface S15 is a concave surface, and an image side surface S16 is a convex surface.

The optical image lens 200 further comprises an aperture ST, an infrared filter L9 and a protective glass L10. The aperture ST is disposed between the third lens L3 and the fourth lens L4. The infrared filter L9 is disposed between the eighth lens L8 and the protective glass L10. Preferably, the infrared filter L9 is made of glass. The protective glass L10 is disposed between the infrared filter L9 and the imaging surface Im.

In order to maintain good optical performance and high image quality of the optical image lens 200 of the present invention, the optical image lens 200 also satisfies the following conditions:

$$0.68<f/f1<0.97; \quad (1)$$

$$0.28<f/f7<0.48; \quad (2)$$

$$-0.5<f/f23<-0.81; \quad (3)$$

$$0.21<f/(f1+f2+f3+f4+f5+f6+f7+f8)<0.29; \quad (4)$$

$$Vd2\geq 60; \quad (5)$$

wherein, f is a focal length of the optical image lens 200; f1 is a focal length of the first lens L1; f2 is a focal length of the second lens L2; f3 is a focal length of the third lens L3; f4 is a focal length of the fourth lens L4; f5 is a focal length of the fifth lens L5; f6 is a focal length of the sixth lens L6; f7 is a focal length of the seventh lens L7; f8 is a focal length of the eighth lens L8; f23 is a focal length of the first doublet; Vd2 is an Abbe number of the second lens L2. In addition, preferably, the optical image lens 200 has a full field of view between 27 degrees and 40 degrees.

Table II below is the data of the optical image lens 200 of the second embodiment of the present invention, including the focal length f of the optical image lens 200, aperture value Fno, field of view FOV, the radius of curvature R of each lens, the distance between each surface and the next surface on the optical axis, the refractive index Nd of each lens and the Abbe number Vd of each lens, in which the unit of focal length, radius of curvature and thickness is mm.

TABLE II f = 18.2 mm; Fno = 1.7; FOV = 31.38°

| Serial No. | Radius of curvature (mm) | Thickness (mm) | (Nd) | (Vd) | |
|---|---|---|---|---|---|
| 1 | 19.434 | 3.847 | 2 | 25.4 | 1st lens |
| 2 | infinity | 0.061 | | | |
| 3 | 10.438 | 2.657 | 1.61 | 63.3 | 2nd lens |
| 4 | −33.857 | 1.022 | 1.78 | 25.6 | 3rd lens |
| 5 | 7.437 | 1.155 | | | |
| 6 | infinity | 0.994 | | | |
| 7 | −11.368 | 2.158 | 1.62 | 35.7 | 4th lens |
| 8 | 10.183 | 5.799 | 1.8 | 46.5 | 5th lens |
| 9 | −20.337 | 0.575 | | | |
| 10 | 33.792 | 2.450 | 1.8 | 46.5 | 6th lens |
| 11 | −49.684 | 0.219 | | | |
| 12 | 31.268 | 5.841 | 1.9 | 31.3 | 7th lens |
| 13 | 59.368 | 1.632 | | | |
| 14 | −12.262 | 1.279 | 1.78 | 25.6 | 8th lens |
| 15 | −26.563 | 0.740 | | | |
| 16 | infinity | 0.400 | 1.51 | 64.1 | Infrared filter |
| 17 | infinity | 1.256 | | | |
| 18 | infinity | 0.500 | 1.51 | 64.1 | Protective glass |
| 19 | infinity | 0.100 | | | |
| 20 | infinity | | | | |

From the above Table II we can see that the focal length f of the optical image lens 200 is 18.2 mm; the focal length f1 of the first lens L1 is 19.26 mm; the focal length 12 of the second lens L2 is 18.23 mm; the focal length f3 of the third lens L3 is −8.95 mm; the focal length f4 of the fourth lens L4 is −27.3 mm; the focal length f5 of the fifth lens L5 is 18.19 mm; the focal length f6 of the sixth lens L6 is 25.23 mm; the focal length f7 of the seventh lens L7 is 66.07 mm; the focal length f8 of the eighth lens L8 is −29.98 mm; the focal length 123 of the first doublet is −26.43 mm; the Abbe number Vd2 of the second lens L2 is 63.3. From the above, it can be concluded that f/(f1+f2+f3+f4+f5+f6+f7+f8) is about 0.2253, Vd2=63.3, f/f7 is about 0.2754, f/f23 is about −0.6886, f/f1 is about 0.9449, which satisfies the conditions set by points (1) to (5) above.

Figure 4:
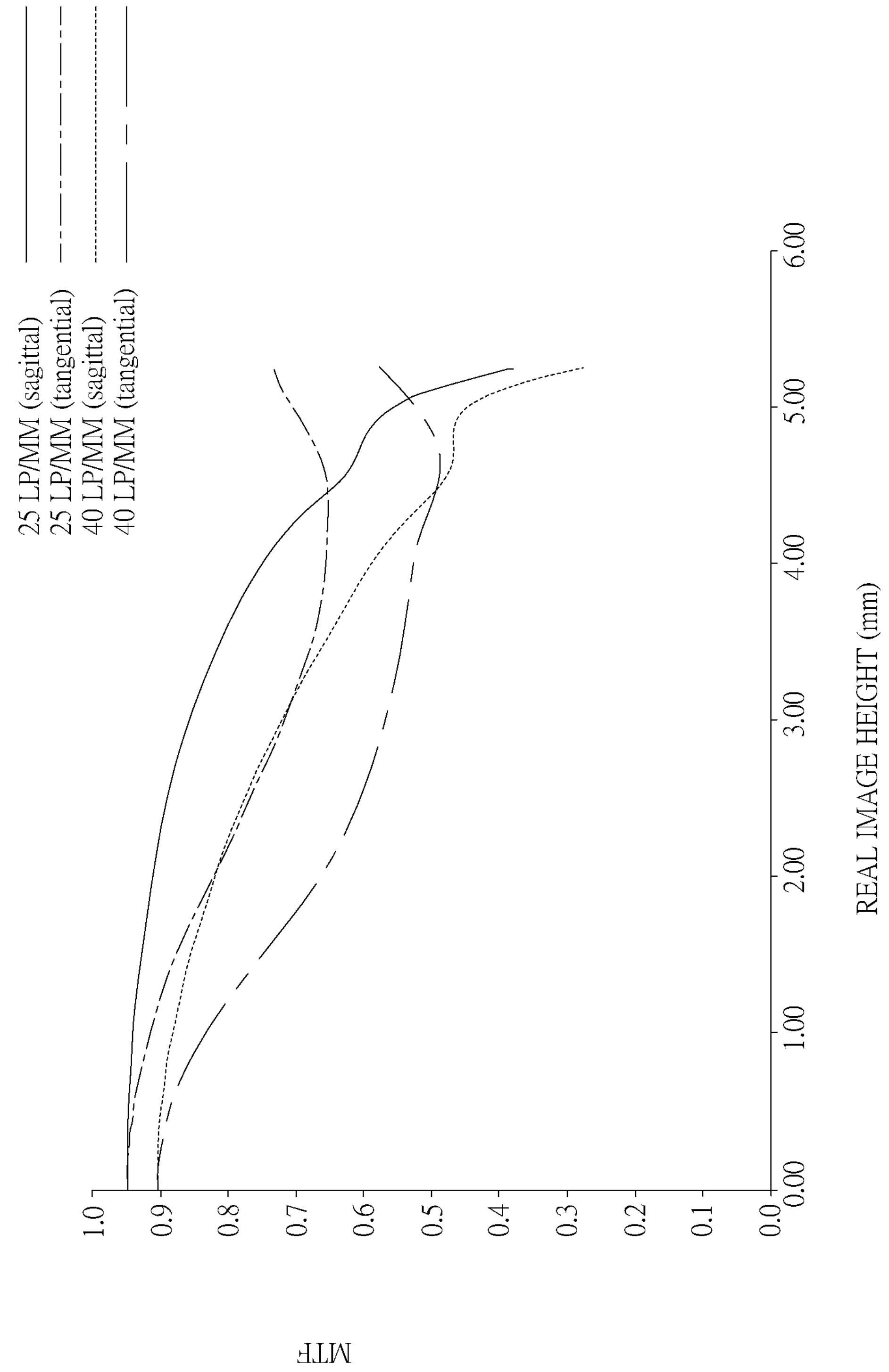
FIG. 4A is an MTF (modulation transfer function) chart of the optical image lens in accordance with the second embodiment of the present invention.
FIG. 4B illustrates the astigmatic field curves of the optical image lens in accordance with the second embodiment of the present invention.
FIG. 4C is the distortion chart of the optical image lens in accordance with the second embodiment of the present invention.
Figure 4C:
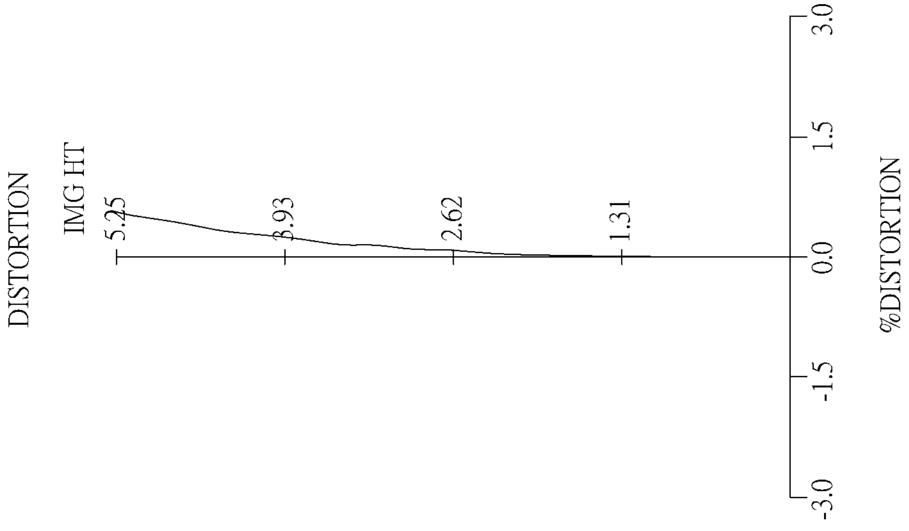
Figure 4B:
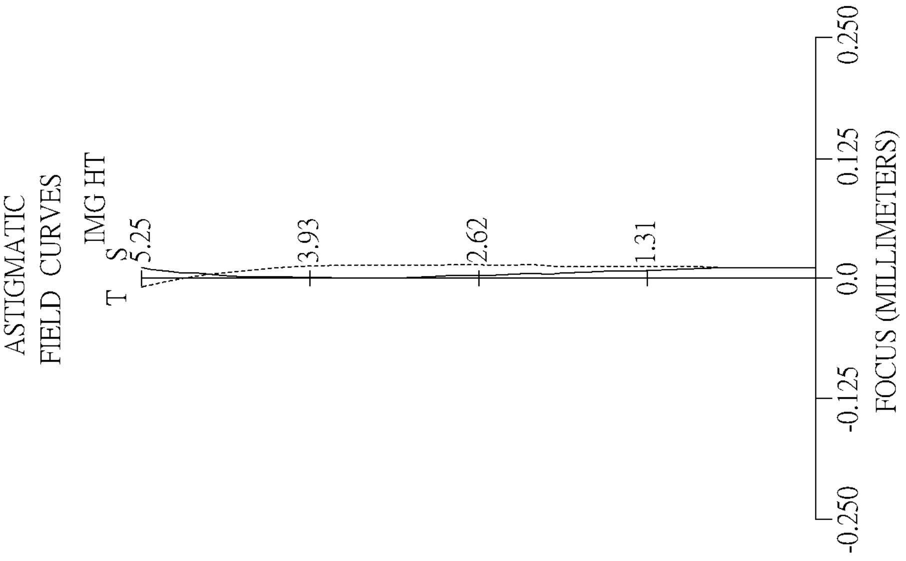

As shown in FIG. 4A to FIG. 4C, the optical image lens 200 of the second embodiment of the present invention could effectively improve the image quality and reduce the distortion.

Figure 5:
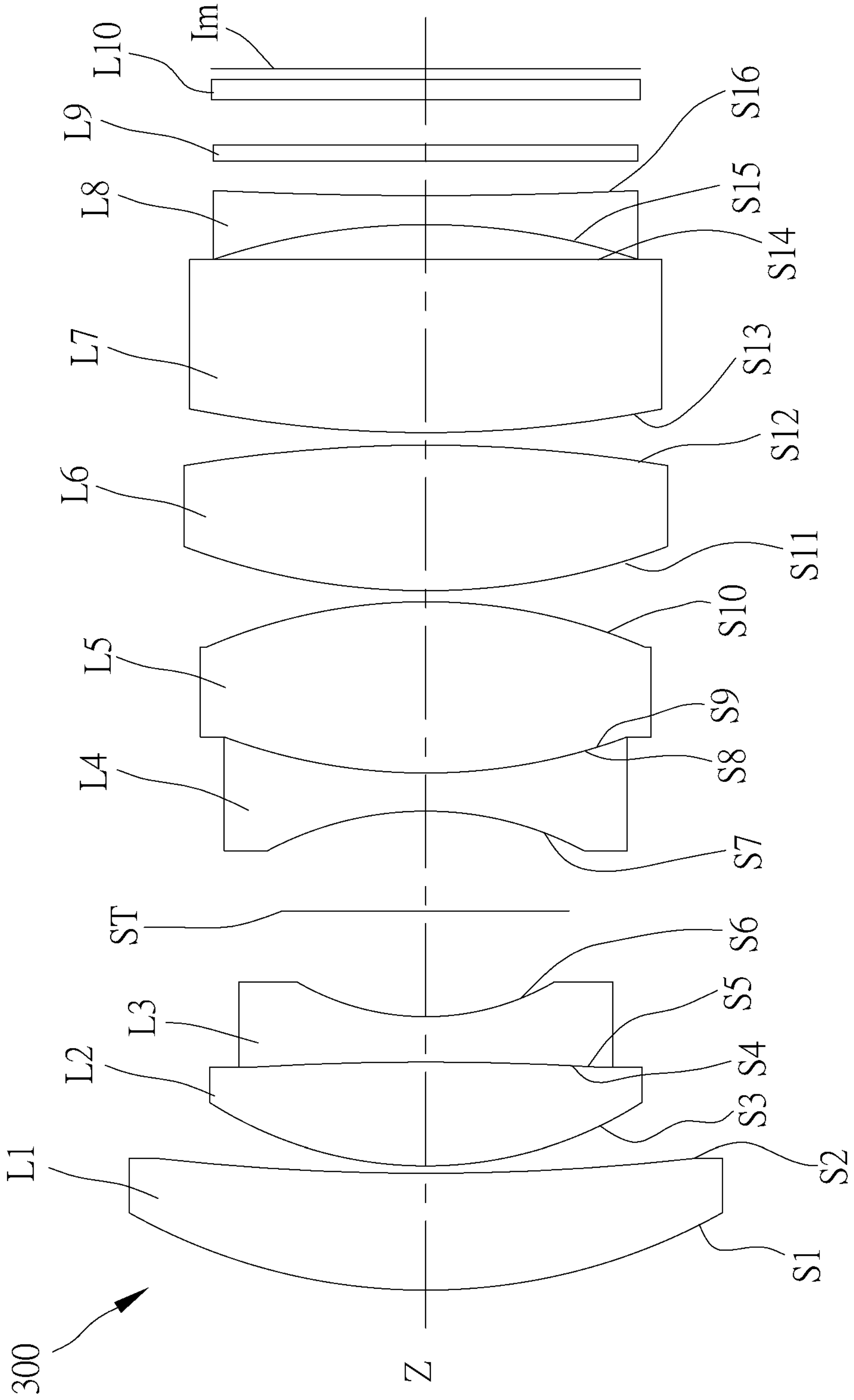
FIG. 5 is a schematic drawing illustrating an optical image lens in accordance with a third embodiment of the present invention.

Referring to FIG. 5, an optical image lens 300 in accordance with a third embodiment of the present invention is shown. The optical image lens 300 comprises, from an object side to an image side along an optical axis Z, a first lens L1, a second lens L2, a third lens L3, a fourth lens L4, a fifth lens L5, a sixth lens L6, a seventh lens L7 and an eighth lens L8.

The first lens L1 has positive refractive power, and an object side surface S1 is a convex surface, and an image side surface S2 is a concave surface.

The second lens L2 and the third lens L3 are glued to form a first doublet, which could effectively improve the chromatic aberration of the lens and control the aberration generation. Preferably, in this embodiment, the first doublet has negative refractive power. Further, in this embodiment, the second lens L2 has positive refractive power, and an object side surface S3 is a convex surface, and an image side surface S4 is also a convex surface; the third lens L3 has negative refractive power, and an object side surface S5 is a convex surface glued to the image side surface S4 of the second lens L2, and an image side surface S6 is a concave surface; the surface of the second lens L2 bonding to the third lens L3 is a convex surface convex toward the image side.

The fourth lens L4 and the fifth lens L5 are glued to form a second doublet, which could effectively improve the chromatic aberration of the lens and control the aberration generation. Preferably, the second doublet has positive refractive power. The fourth lens L4 has negative refractive power, and an object side surface S7 is a concave surface. In this embodiment, the fourth lens L4 is a biconcave lens, and the object side surface S7 and an image side surface S8 are both concave surfaces. The fifth lens L5 has positive refractive power, and an image side surface S10 is a convex surface. In this embodiment, the fifth lens L5 is a biconvex lens, and an object side surface S9 is a convex surface glued to the image side surface S8 of the fourth lens L4. The surface of the fourth lens L4 bonded to the fifth lens L5 is a convex surface convex toward the object side.

The sixth lens L6 has positive refractive power. In this embodiment, the sixth lens L6 is a biconvex lens, and an object side surface S11 and an image side surface S12 are both convex surfaces.

The seventh lens L7 has positive refractive power, and an object side surface S13 is a convex surface, and an image side surface S14 is a plane.

The eighth lens L8 has negative refractive power. The eighth lens L8 may be a plano-concave lens, a biconcave lens or a meniscus lens having the concave surface thereof facing the object side. In this embodiment, the eighth lens L8 is a biconcave lens, and an object side surface S15 is a concave surface, and an image side surface S16 is also a concave surface.

The optical image lens 300 further comprises an aperture ST, an infrared filter L9 and a protective glass L10. The aperture ST is disposed between the third lens L3 and the fourth lens L4. The infrared filter L9 is disposed between the eighth lens L8 and the protective glass L10. Preferably, the infrared filter L9 is made of glass. The protective glass L10 is disposed between the infrared filter L9 and the imaging surface Im.

In order to maintain good optical performance and high image quality of the optical image lens 300 of the present invention, the optical image lens 300 also satisfies the following conditions:

$$0.68<f/f1<0.97; \quad (1)$$

$$0.28<f/f7<0.48; \quad (2)$$

$$-0.5<f/f23<-0.81; \quad (3)$$

$$0.21<f/(f1+f2+f3+f4+f5+f6+f7+f8)<0.29; \quad (4)$$

$$Vd2\geq 60; \quad (5)$$

wherein, f is the focal length of the optical image lens 300; f1 is the focal length of the first lens L1; f2 is the focal length of the second lens L2; f3 is the focal length of the third lens L3; f4 is the focal length of the fourth lens L4; f5 is the focal length of the fifth lens L5; f6 is the focal length of the sixth lens L6; f7 is the focal length of the seventh lens L7; f8 is the focal length of the eighth lens L8; f23 is the focal length of the first doublet; Vd2 is the Abbe number of the second lens L2. In addition, preferably, the optical image lens 300 has a full field of view between 27 degrees and 40 degrees.

Table III below is the data of the optical image lens 300 of the third embodiment of the present invention, including the focal length f of the optical image lens 300, aperture value Fno, field of view FOV, the radius of curvature R of each lens, the distance between each surface and the next surface on the optical axis, the refractive index Nd of each lens and the Abbe number Vd of each lens, in which the unit of focal length, radius of curvature and thickness is mm.

TABLE III f = 16.43 mm; Fno = 1.63; FOV = 35.36°

| Serial No. | Radius of curvature (mm) | Thickness (mm) | (Nd) | (Vd) | |
|---|---|---|---|---|---|
| 1 | 14.948 | 2.881 | 2 | 25.5 | 1st lens |
| 2 | 63.777 | 0.173 | | | |
| 3 | 9.602 | 2.542 | 1.62 | 63.3 | 2nd lens |
| 4 | −95.611 | 1.143 | 1.81 | 22.8 | 3rd lens |
| 5 | 6.380 | 2.572 | | | |
| 6 | infinity | 2.493 | | | |
| 7 | −8.045 | 0.933 | 1.62 | 36.3 | 4th lens |
| 8 | 14.102 | 4.204 | 1.80 | 46.6 | 5 th lens |
| 9 | −14.102 | 0.279 | | | |
| 10 | 17.038 | 3.568 | 1.80 | 46.6 | 6th lens |
| 11 | −36.240 | 0.332 | | | |
| 12 | 29.782 | 4.237 | 1.90 | 31.3 | 7th lens |
| 13 | 415.906 | 0.867 | | | |
| 14 | −16.908 | 0.703 | 1.78 | 25.7 | 8th lens |
| 15 | 104.937 | 0.867 | | | |
| 16 | infinity | 0.400 | 1.51 | 64.1 | Infrared filter |
| 17 | infinity | 1.124 | | | |
| 18 | infinity | 0.500 | 1.51 | 64.1 | Protective glass |
| 19 | infinity | 0.275 | | | |
| 20 | infinity | | | | |

From the above Table III we can see that the focal length f of the optical image lens 300 is 16.43 mm; the focal length f1 of the first lens L1 is 18.79 mm; the focal length f2 of the second lens L2 is 15.94 mm; the focal length f3 of the third lens L3 is −7.69 mm; the focal length f4 of the fourth lens L4 is −15.65 mm; the focal length f5 of the fifth lens L5 is 14.58 mm; the focal length f6 of the sixth lens L6 is 14.79 mm; the focal length 17 of the seventh lens L7 is 35 mm; the focal length f8 of the eighth lens L8 is −18.36 mm; the focal length f23 of the first doublet is −21.23 mm; the Abbe number Vd2 of the second lens L2 is 63.3. From the above, it can be concluded that f/(f1+f2+f3+f4+f5+f6+f7+f8) is about 0.2862, Vd2=63.3, f/f7 is about 0.4694, f/f23 is about −0.7739, f/f1 is about 0.8744, which satisfies the conditions set by points (1) to (5) above.

Figure 6:
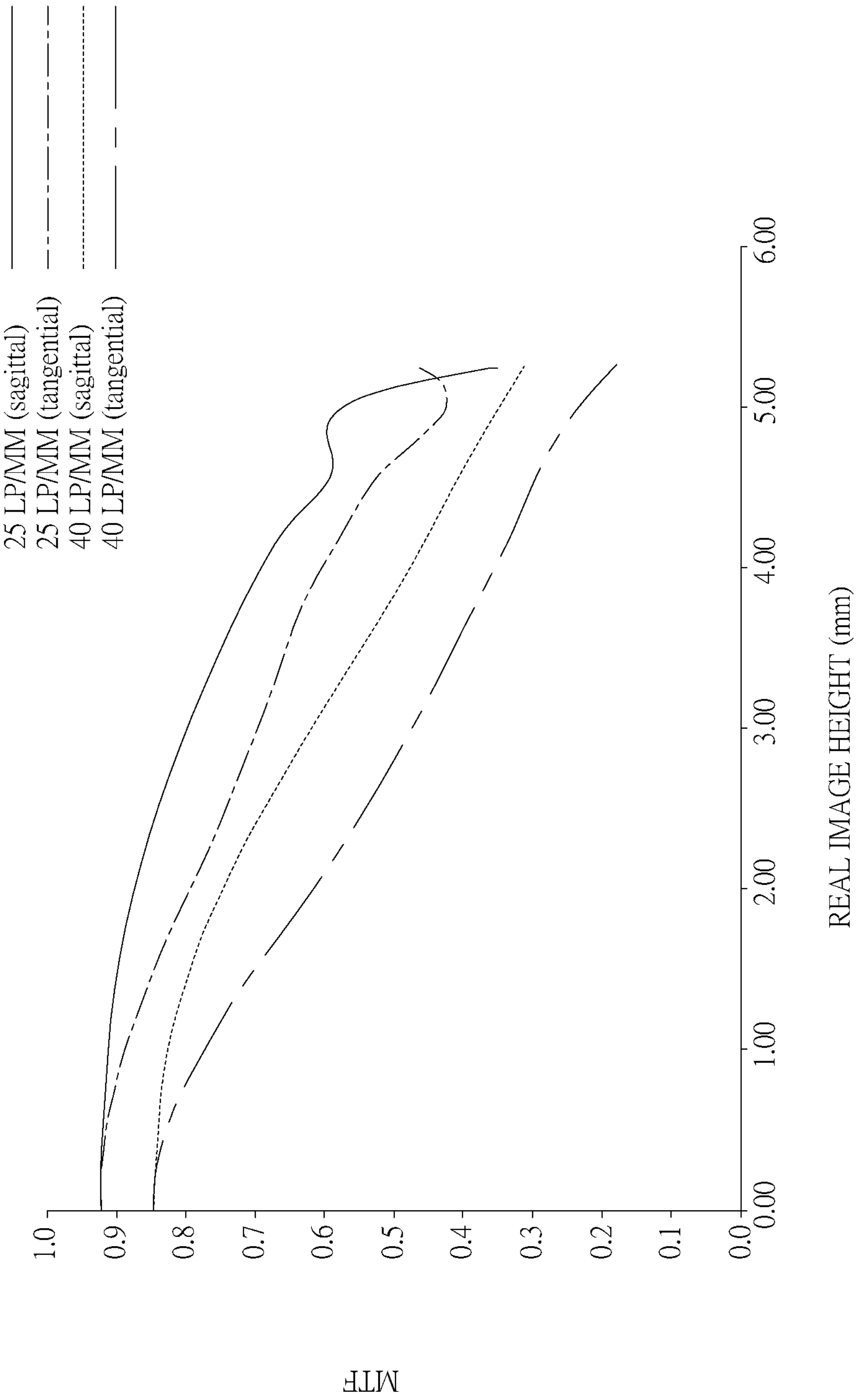
FIG. 6A is an MTF (modulation transfer function) chart of the optical image lens in accordance with the third embodiment of the present invention.
FIG. 6B illustrates the astigmatic field curves of the optical image lens in accordance with the third embodiment of the present invention.
FIG. 6C is the distortion chart of the optical image lens in accordance with the third embodiment of the present invention.
Figure 6:
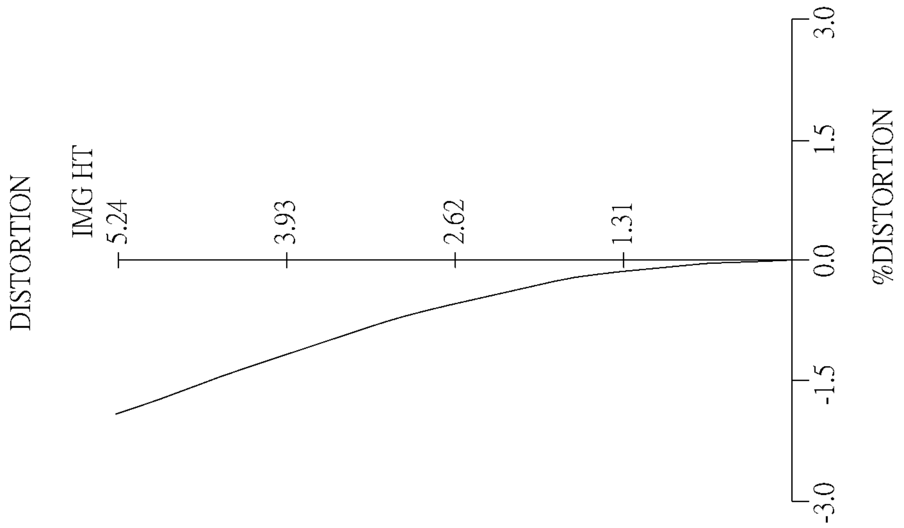
Figure 6:
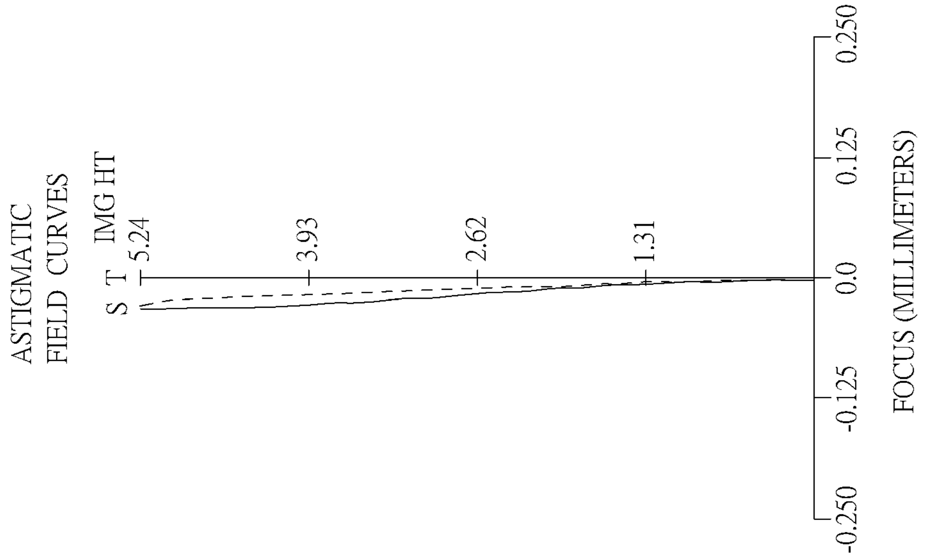

As shown in FIG. 6A to FIG. 6C, the optical image lens 300 of the third embodiment of the present invention could effectively improve the image quality and reduce the distortion.

Figure 7:
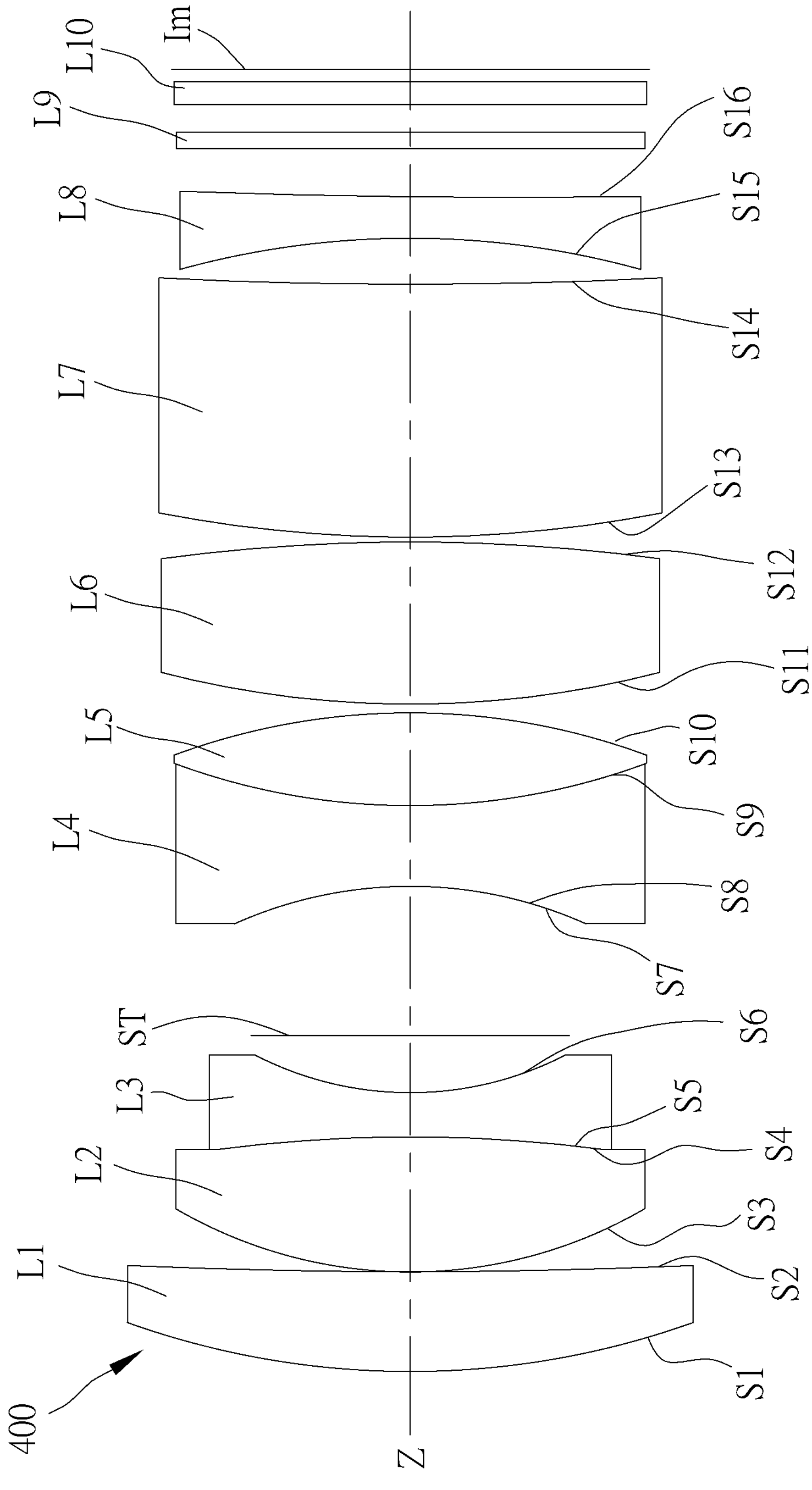
FIG. 7 is a schematic drawing illustrating an optical image lens in accordance with a fourth embodiment of the present invention.

Referring to FIG. 7, an optical image lens 400 in accordance with a fourth embodiment of the present invention is shown. The optical image lens 400 comprises, from an object side to an image side along an optical axis Z, a first lens L1, a second lens L2, a third lens L3, a fourth lens L4, a fifth lens L5, a sixth lens L6, a seventh lens L7 and an eighth lens L8.

The first lens L1 has positive refractive power, and an object side surface S1 is a convex surface, and an image side surface S2 is a concave surface.

The second lens L2 and the third lens L3 are glued to form a first doublet, which could effectively improve the chromatic aberration of the lens and control the aberration generation. Preferably, in this embodiment, the first doublet has negative refractive power. Further, in this embodiment, the second lens L2 has positive refractive power, and an object side surface S3 is a convex surface, and an image side surface S4 is also a convex surface; the third lens L3 has negative refractive power, and an object side surface S5 is a concave surface glued to the image side surface S4 of the second lens L2, and an image side surface S6 is a concave surface; the surface of the second lens L2 bonding to the third lens L3 is a convex surface convex toward the image side.

The fourth lens L4 and the fifth lens L5 are glued to form a second doublet, which could effectively improve the chromatic aberration of the lens and control the aberration generation. Preferably, the second doublet has positive refractive power. The fourth lens L4 has negative refractive power, and an object side surface S7 is a concave surface. In this embodiment, the fourth lens L4 is a biconcave lens, and the object side surface S7 and an image side surface S8 are both concave surfaces. The fifth lens L5 has positive refractive power, and an image side surface S10 is a convex surface. In this embodiment, the fifth lens L5 is a biconvex lens, and an object side surface S9 is a convex surface glued to the image side surface S8 of the fourth lens L4. The surface of the fourth lens L4 bonded to the fifth lens L5 is a convex surface convex toward the object side.

The sixth lens L6 has positive refractive power. In this embodiment, the sixth lens L6 is a biconvex lens, and an object side surface S11 and an image side surface S12 are both convex surfaces.

The seventh lens L7 has positive refractive power, and an object side surface S13 is a convex surface, and an image side surface S14 is a concave surface.

The eighth lens L8 has negative refractive power. The eighth lens L8 may be a plan-concave lens, a biconcave lens or a meniscus lens having the concave surface thereof facing the object side. In this embodiment, the eighth lens L8 is a biconcave lens, and an object side surface S15 is a concave surface, and an image side surface S16 is also a concave surface. However, this is not a limitation of the present invention. In other embodiments, the eighth lens L8 could be designed as a plana-concave lens with the concave surface thereof facing the object side.

The optical image lens 400 further comprises an aperture ST, an infrared filter L9 and a protective glass L10. The aperture ST is disposed between the third lens L3 and the fourth lens L4. The infrared filter L9 is disposed between the eighth lens L8 and the protective glass L10. Preferably, the infrared filter L9 is made of glass. The protective glass L10 is disposed between the infrared filter L9 and the imaging surface Im.

In order to maintain good optical performance and high image quality of the optical image lens 400 of the present invention, the optical image lens 400 also satisfies the following conditions:

$$0.68<f/f1<0.97; \quad (1)$$

$$0.28<f/f7<0.48; \quad (2)$$

$$-0.5<f/f23<-0.81; \quad (3)$$

$$0.21<f/(f1+f2+f3+f4+f5+f6+f7+f8)<0.29; \quad (4)$$

$$Vd2\geq 60; \quad (5)$$

wherein, f is the focal length of the optical image lens 400; f1 is the focal length of the first lens L1; f2 is the focal length of the second lens L2; f3 is the focal length of the third lens L3; f4 is the focal length of the fourth lens L4; f5 is the focal length of the fifth lens L5; f6 is the focal length of the sixth lens L6; f7 is the focal length of the seventh lens L7; f8 is the focal length of the eighth lens L8; f23 is the focal length of the first doublet; Vd2 is the Abbe number of the second lens L2. In addition, preferably, the optical image lens 400 has a full field of view between 27 degrees and 40 degrees.

Table IV below is the data of the optical image lens 400 of the fourth embodiment of the present invention, including the focal length f of the optical image lens 400, aperture value Fno, field of view FOV, the radius of curvature R of each lens, the distance between each surface and the next surface on the optical axis, the refractive index Nd of each lens and the Abbe number Vd of each lens, in which the unit of focal length, radius of curvature and thickness is mm.

TABLE IV f = 14.48 mm; Fno = 1.49; FOV = 40°

| Serial No. | Radius of curvature (mm) | Thickness (mm) | (Nd) | (Vd) | |
|---|---|---|---|---|---|
| 1 | 18.638 | 2.184 | 2 | 27.4 | 1st lens |
| 2 | 131.632 | 0.054 | | | |
| 3 | 10.425 | 2.927 | 1.62 | 60 | 2nd lens |
| 4 | −34.054 | 0.999 | 1.79 | 25 | 3rd lens |
| 5 | 7.588 | 1.245 | | | |
| 6 | infinity | 3.282 | | | |
| 7 | −9.733 | 1.753 | 1.62 | 40 | 4th lens |
| 8 | 14.340 | 2.090 | 1.80 | 52.2 | 5th lens |
| 9 | −14.340 | 0.160 | | | |
| 10 | 22.426 | 3.562 | 1.81 | 54 | 6th lens |
| 11 | −43.001 | 0.104 | | | |
| 12 | 30.358 | 5.599 | 2.33 | 74.6 | 7th lens |
| 13 | 107.579 | 0.985 | | | |
| 14 | −18.561 | 0.930 | 1.71 | 58.9 | 8th lens |
| 15 | 143.619 | 1.019 | | | |

TABLE IV-continued

| f = 14.48 mm; Fno = 1.49; FOV = 40° | | | | | |
|---|---|---|---|---|---|
| Serial No. | Radius of curvature (mm) | Thickness (mm) | (Nd) | (Vd) | |
| 16 | infinity | 0.400 | 1.51 | 64.1 | Infrared filter |
| 17 | infinity | 0.589 | | | |
| 18 | infinity | 0.500 | 1.51 | 64.1 | Protective glass |
| 19 | infinity | 0.275 | | | |
| 20 | infinity | | | | |

From the above Table IV we can see that the focal length f of the optical image lens 400 is 14.48 mm; the focal length f1 of the first lens L1 is 21.32 mm; the focal length 12 of the second lens L2 is 18.191 nm; the focal length f3 of the third lens L3 is −9.12 mm; the focal length f4 of the fourth lens L4 is −19.56 mm; the focal length f5 of the fifth lens L5 is 14.71 mm; the focal length f6 of the sixth lens L6 is 18.62 mm; the focal length f7 of the seventh lens L7 is 30.48 mm; the focal length f8 of the eighth lens L8 is −23.1 mm; the focal length f23 of the first doublet is −28.61 mm; the Abbe number Vd2 of the second lens L2 is 60. From the above, it can be concluded that f/(f1+f2+f3+f4+f5+f6+f7+f8) is about 0.2809, Vd2=60, f/f7 is about 0.4750, f/f23 is about −0.5061, f/f1 is about 0.6791, which satisfies the conditions set by points (1) to (5) above.

Figure 8:
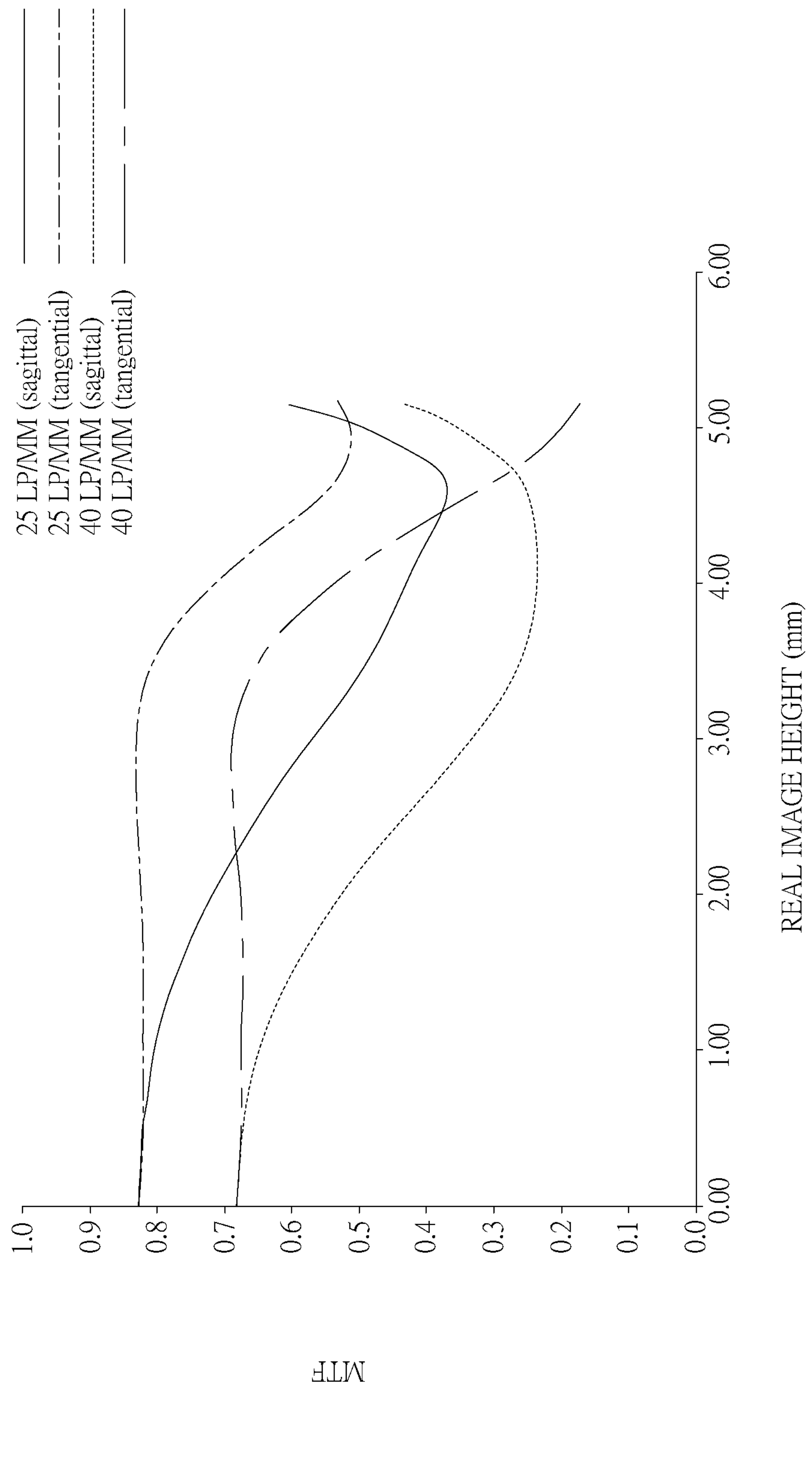
FIG. 8A is an MTF (modulation transfer function) chart of the optical image lens in accordance with the fourth embodiment of the present invention.
FIG. 8B illustrates the astigmatic field curves of the optical image lens in accordance with the fourth embodiment of the present invention.
FIG. 8C is the distortion chart of the optical image lens in accordance with the fourth embodiment of the present invention.
Figure 8:
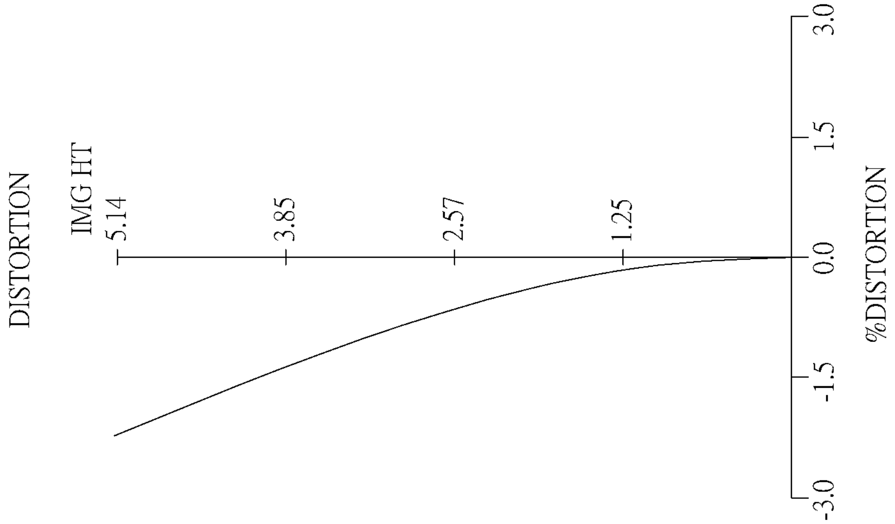
Figure 8:
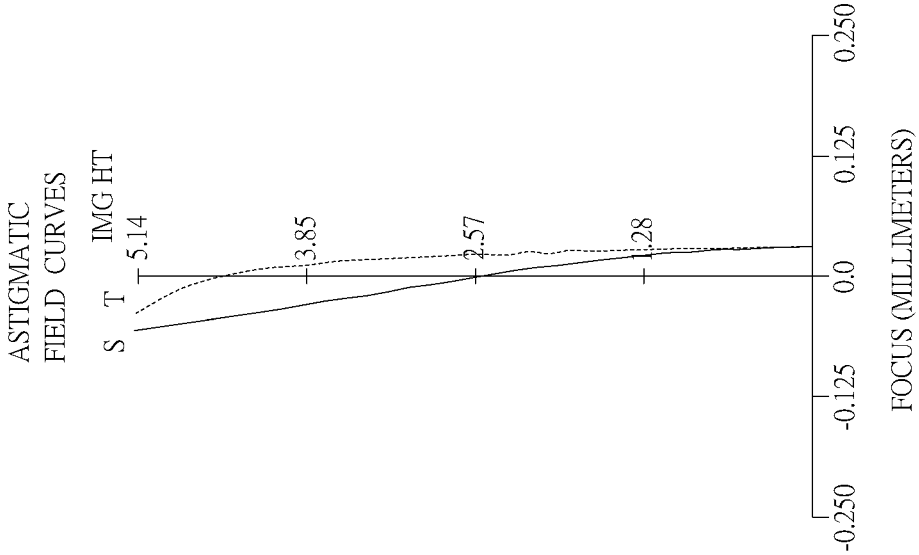

As shown in FIG. 8A to FIG. 8C, the optical image lens 400 of the fourth embodiment of the present invention could effectively improve the image quality and reduce the distortion.

It must be pointed out that the embodiments described above are only some preferred embodiments of the present invention. The data listed in the abovementioned table are not limitations of the present invention. In other embodiments, the parameters could be changed appropriately. All equivalent structures which employ the concepts disclosed in this specification and the appended claims should fall within the scope of the present invention.

What is claimed is:

1. An optical image lens, comprising, from an object side to an image side along an optical axis:

a first lens having positive refractive power;
a second lens;
a third lens bonded with said second lens to form a first doublet, wherein said first doublet has negative refractive power;
a fourth lens;
a fifth lens bonded with said fourth lens to form a second doublet, said second doublet having positive refractive power;
a sixth lens having positive refractive power;
a seventh lens having positive refractive power; and
an eighth lens having negative refractive power.

2. The optical image lens as claimed in claim 1, wherein said second lens has positive refractive power; said third lens has negative refractive power.

3. The optical image lens as claimed in claim 1, wherein said fourth lens has negative refractive power; said fifth lens has positive refractive power.

4. The optical image lens as claimed in claim 1, wherein the optical image lens further satisfies:

$$0.68<f/f1<0.97;$$

wherein f is a focal length of the optical image lens, f1 is a focal length of said first lens.

5. The optical image lens as claimed in claim 1, wherein the optical image lens further satisfies:

$$0.28<f/f7<0.48;$$

wherein f is a focal length of the optical image lens, f7 is a focal length of said seventh lens.

6. The optical image lens as claimed in claim 1, wherein the optical image lens further satisfies:

$$-0.5<f/f23<0.81;$$

wherein f is a focal length of the optical image lens, f23 is a focal length of said first doublet.

7. The optical image lens as claimed in claim 1, wherein the optical image lens further satisfies:

$$0.21<f7(f1+f2+f3+f4+f5+f6+f7+f8)<0.29;$$

wherein f is a focal length of the optical image lens; f1 is a focal length of said first lens; f2 is a focal length of said second lens; f3 is a focal length of said third lens; f4 is a focal length of said fourth lens; f5 is a focal length of said fifth lens; f6 is a focal length of said sixth lens; f7 is a focal length of said seventh lens; f8 is a focal length of said eighth lens.

8. The optical image lens as claimed in claim 1, wherein the optical image lens further satisfies:

$$Vd2\geq 60;$$

wherein Vd2 is an Abbe number of said second lens.

9. The optical image lens as claimed in claim 1, wherein the optical image lens further satisfies at least one of the conditions of:

1) an object side surface of said first lens is a convex surface;
2) an object side surface of said second lens is a convex surface and an image side surface of said third lens is a concave surface;
3) an object side surface of said fourth lens is a concave surface and an image side surface of said fifth lens is a convex surface;
4) said sixth lens is a biconvex lens;
5) an object side surface of said seventh lens is a convex surface; and
6) an object side surface of said eighth lens is a concave surface.

10. The optical image lens as claimed in claim 1, wherein a full field of view of the optical image lens is between 27 degrees and 40 degrees.

11. An optical image lens, comprising, from an object side to an image side along an optical axis:

a first lens,
a second lens,
a third lens,
a fourth lens,
a fifth lens,
a sixth lens,
a seventh lens; and
an eighth lens,
wherein the optical image lens satisfies:

$$0.68<f/f1<0.97;0.28<f/f7<00.48;$$

$$0.21<f/(f1+f2+f3\pm f4+f5+f6+f7+f8)<0.29;$$

wherein f is a focal length of the optical image lens; f1 is a focal length of said first lens; f2 is a focal length of said second lens; f3 is a focal length of said third lens; f4 is a focal length of said fourth lens; f5 is a focal length of said fifth lens; f6 is a focal length of said sixth lens; f7 is a focal length of said seventh lens; f8 is a focal length of said eighth lens.

12. The optical image lens as claimed in claim 11, wherein said third lens and said second lens are glued to form a first doublet.

13. The optical image lens as claimed in claim 12, wherein the optical image lens further satisfies:

$$-0.5<f123<-0.81;$$

wherein f23 is the focal length of said first doublet.

14. The optical image lens as claimed in claim 11, wherein said fifth lens and said fourth lens are glued to form a second doublet.

15. The optical image lens as claimed in claim 11, which satisfies the condition of: Vd2≥60, wherein Vd2 is an Abbe number of said second lens.

16. The optical image lens as claimed in claim 11, wherein said first lens has positive refractive power; said second lens has positive refractive power; said third lens has negative refractive power; said fourth lens has negative refractive power; said fifth lens has positive refractive power; said sixth lens has positive refractive power; said seventh lens has positive refractive power; said eighth lens has negative refractive power.

17. The optical image lens as claimed in claim 16, wherein the optical image lens further satisfies at least one of the conditions of:

1) an object side surface of said first lens is a convex surface;
2) an object side surface of said second lens is a convex surface and an image side surface of said third lens is a concave surface;
3) an object side surface of said fourth lens is a concave surface and an image side surface of said fifth lens is a convex surface;
4) said sixth lens is a biconvex lens;
5) an object side surface of said seventh lens is a convex surface; and
6) an object side surface of said eighth lens is a concave surface.

18. The optical image lens as claimed in claim 11, wherein a full field of view of the optical image lens is between 27 degrees and 40 degrees.

* * * * *